Figure 1:
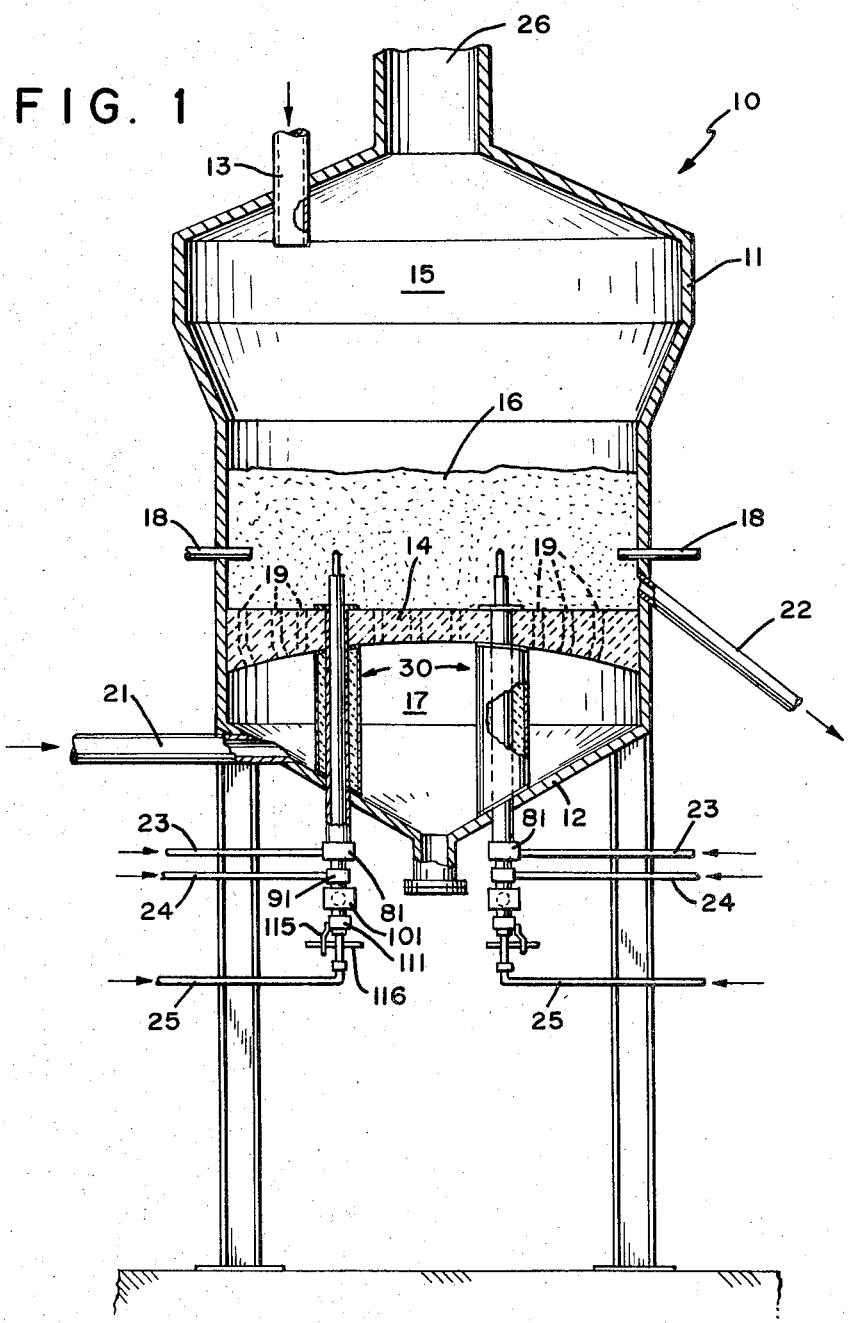

United States Patent
Steever et al.

[11] 3,861,862
[45] Jan. 21, 1975

[54] FUEL GUN FOR FLUIDIZED BED REACTOR

[76] Inventors: Andrew B. Steever, 70 Benjamin St., Old Greenwich, Conn. 06870; Walfred W. Jukkola, 10 Guyer Rd., Westport, Conn. 06880

[22] Filed: Sept. 5, 1972

[21] Appl. No.: 286,157

[52] U.S. Cl. .................. 432/58, 432/15, 34/57 A, 239/424
[51] Int. Cl. ............................................. F27b 15/14
[58] Field of Search ............ 432/15, 58, 4; 34/57 R, 34/10, 67, 57 A; 431/170, 179, 7, 328, 329; 110/28 J; 239/424

[56] References Cited
UNITED STATES PATENTS

| 1,713,260 | 5/1929 | Chandler | 239/424 |
| 2,607,666 | 8/1952 | Martin | 432/58 |
| 2,666,269 | 1/1954 | Parry | 34/10 |
| 3,417,978 | 12/1968 | Suzukawa et al. | 34/57 |
| 3,466,021 | 9/1969 | Van Weert et al. | 432/58 |
| 3,552,033 | 1/1971 | Steever et al. | 34/57 A |
| 3,737,283 | 6/1973 | Nikles | 432/58 |

FOREIGN PATENTS OR APPLICATIONS

| 736,609 | 9/1955 | Great Britain | 239/424.5 |

Primary Examiner—John J. Camby
Assistant Examiner—Henry C. Yuen
Attorney, Agent, or Firm—H. M. Snyder; Burtsell J. Kearns; Theodore M. Jablon

[57] ABSTRACT

A gun for injecting fuel through the constriction plate of a fluidized bed reactor is removable for cleaning. Concentric sleeve elements, positioned about the gun, provide annular passageways through which air under pressure flows into the fluidized bed serving both to cool the gun elements and to prevent sifting of bed material or fuel along the gun and/or into the windbox.

11 Claims, 6 Drawing Figures

PATENTED JAN 21 1975 3,861,862
SHEET 2 OF 2

FUEL GUN FOR FLUIDIZED BED REACTOR

This invention is directed to a gun assembly for injecting fuel into the reaction compartment of a fluidized bed reactor.

Fluidized bed reactors are highly versatile apparatus, which, in various forms, can carry out the processes of drying, sizing, roasting, calcining and heat treatment of solids with gases in the chemical, metallurgical and other materials processing fields. When the fluidized bed reactor is employed to carry out endothermic reactions, it is advantageous, in some cases, to inject fuel directly into the fluidized bed. There are numerous instances in which the fuel (fuel oil, for example, or natural gas) is injected into the fluidized bed through the side walls of the reactor vessel.

When fuel oil is used, fuel guns are employed which extend through the side walls at some distance, e.g., about one foot, above the constriction plate. These fuel guns extend into the reactor chamber less than one foot, and with such an arrangement, reasonably good fuel distribution in the fluidized bed is obtained where the bed diameter is as much as 20 feet. However, it is readily appreciated that improved fuel distribution could be obtained if means were available to inject fuel oil directly into the central region of the fluidized bed, particularly when the bed diameters substantially exceed 20 feet.

When natural gas is the fuel, pipes of different lengths are laid directly on the constriction plate as fuel conduits. It will be appreciated that as these pipes are made long enough to reach to the center of large constriction plates, they are subject to warpage and twisting under the severe conditions prevailing in the reactor. Accordingly, an improved means for injecting natural gas into the central region of a fluidized bed would be very desirable.

Vertically arranged fuel guns extending through the constriction plate of the fluidized bed reactor appear to offer a ready solution to the fuel distribution problem, since such fuel guns can supply fuel directly to the central region of the fluidized bed. Indeed, there are instances where such vertically oriented fuel guns have been provided. However, there are problems associated with these vertically oriented fuel guns, particularly in those cases where a hot windbox is provided beneath the constriction plate through which the fuel guns must extend. It is desirable, for example, that the fuel flowing in the gun remains relatively cool until it is injected into the fluidized bed to prevent decomposition of the fuel in the gun with consequent formation of a carbonized cake on the internal surface of the gun flow passage. Further, there is the problem associated with sifting of bed material into and through the opening in the constriction plate provided for the fuel gun whereby the gun may become frozen in position. Also, there is the danger that fuel oil, may, under certain circumstances; e.g., at shut-down, flow from the fuel gun without burning and find its way along the fuel gun through the opening in the constriction plate and into the hot windbox whereupon dangerous fires or explosions may occur.

A novel fuel gun assembly has now been provided which incorporates a cooling means and anti-sifting means and is therefore well adopted for injecting fuel into a bed of fluidized material through the constriction plate of a fluidized bed reactor.

It is an object of the invention to provide a fuel gun for a fluidized bed reactor which is readily removable for cleaning purposes.

It is a further object of this invention to provide a fuel gun assembly for injection of fuel into the fluidized bed especially well suited for vertical orientation.

Figure 2:
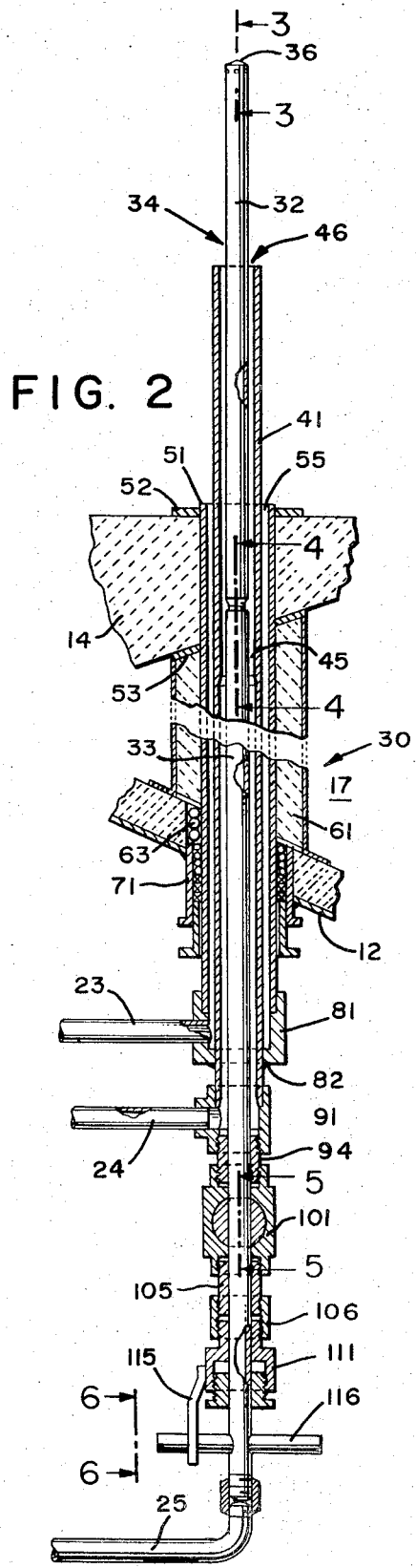
Figure 3:
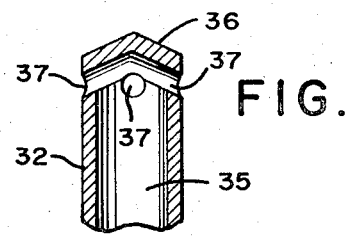
Figure 4:
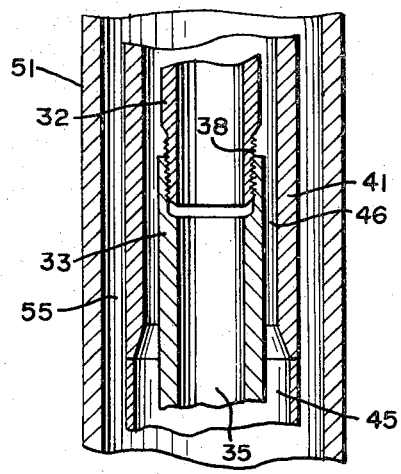
Figure 5:
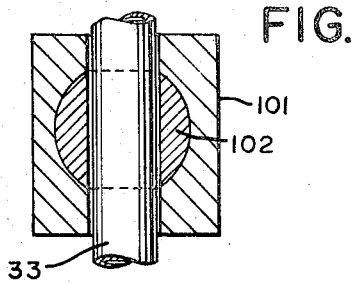
Figure 6:
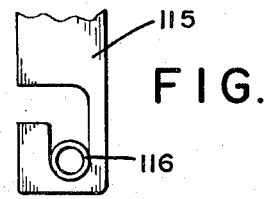

Other objects and advantages will become apparent from the following description taken in conjunction with the accompanying drawings in which;

FIG. 1 is a view partially in section of a fluidized bed reactor incorporating fuel gun assemblies of the present invention, FIG. 2 is a view in section, showing details of the fuel gun assembly in accordance with this invention, FIG. 3 is an enlarged fragmentary sectional view showing the fuel orifices of the fuel gun taken along line 3—3 of FIG. 2, FIG. 4 is an enlarged fragmentary sectional view of the fuel gun and associated structure taken along line 4—4 of FIG. 2, FIG. 5 is a sectional view of the rotary valve taken along line 5—5 of FIG. 2 and FIG. 6 is a view of the fuel gun latch taken along line 6—6 of FIG. 2.

Generally speaking, the fuel gun assembly of the present invention comprises a central elongated tubular element which constitutes the fuel gun, a concentric cylindrical member surrounding but spaced from the fuel gun which constitutes a protection sleeve and a third concentric cylindrical element which surrounds but is spaced from the protection sleeve and constitutes a sealing sleeve.

While fuel flows in the central passageway of the fuel gun, air or other gas under pressure flows in the annular passageways about the fuel gun and about the protection sleeve toward the fluidized bed. This air has a cooling function and, in addition, the air flow ("purge air") in the innermost of these passageways has the particular function of preventing downward sifting of particulate bed materials along the outside of fuel gun which might result in so binding the fuel gun that it could not be removed for cleaning. The effect of this flowing gas is further enhanced by restricting this innermost passageway in the region adjacent the tip of the fuel gun so that the velocity of the air is greatly increased just before it enters the fluidized bed. The air in the outermost passageway not only cools and prevents downward sifting of the bed material, but also has the function of expelling any uncombusted liquid fuel which may tend to flow through the aperture provided for the fuel gun into the windbox.

The sealing sleeve is provided with flanges which are in sealing engagement with the constriction plate of the fluidized bed reactor both on the top surface thereof which forms the base of the reaction chamber and on the lower surface thereof which forms the upper partition of the windbox. The fuel gun assembly traverses the windbox and passes through the lower wall or hopper of the windbox. A stuffing box is provided at the point where the fuel gun assembly passes through the bottom support of the windbox. Either a hot or cold windbox may be employed. The sealing sleeve is sufficiently flexible to take small lateral deflections resulting from differential thermal expansion of the members comprising the windbox, while the stuffing box allows vertical deflection to occur. Below the bottom support of the windbox or hopper, the gas or air lines for the fuel gun assembly cooling and purge passageways are connected, as well as the fuel line for the fuel gun.

Referring now to the drawings, in FIG. 1 there is shown a fluidized bed reactor 10 which incorporates vertically disposed fuel gun assemblies 30 in accordance with the present invention. Thus, the fluidized bed reactor 10 has an insulated upper vessel wall 11 defining the reaction chamber 15 and a lower insulated vessel wall or hopper 12 defining the windbox 17. A conduit 13 is provided for introducing feed stock into the reaction chamber 15. The reaction chamber 15 is separated from the windbox 17 by the constriction plate or dome 14. The constriction plate 14 has a number of tuyeres 19 for communicating the hot windbox 17 with the reaction chamber 15. A fluidized bed 16 is indicated in the reaction chamber 15 and a conduit 22 is provided for removal of solid particulate products. A hot air conduit 21 is provided for supplying fluidizing air to the hot windbox 17 which passes into the reaction chamber 15 through the tuyeres 19. Conduit 26 is provided for the off-gases emanating from the reaction chamber 15. Side fuel guns 18 are provided for injecting fuel oil through the side wall 11 of the reactor. Air lines 23 and 24 and fuel lines 25 are provided below the hopper 12 for the fuel gun assemblies as will be more fully described hereinafter.

Turning now to FIGS. 2 through 6, it can be seen that the principal elements of the fuel gun assembly 30 are the fuel gun 34, the protection sleeve 41 and the sealing sleeve 51. The fuel gun 34 is a tubular element closed at the end 36 with a central fuel passage 35. The fuel gun has a main body 33 and a removable tip unit 32 which is joined to the main body by the threaded joint 38 or equivalent means. Located proximate one end of the tip unit 32 of the fuel gun are the transaxial oil orifices 37. The fuel gun 34 is surrounded by, but spaced from, the concentric protection sleeve 41. Between the protection sleeve 41 and the fuel gun 34 is the gas passageway 45 which has a constricted portion 46 in the region adjacent the tip unit 32 of the fuel gun (see particularly FIG. 4). Surrounding the protection sleeve 41 and spaced therefrom is the sealing sleeve 51. Between the sealing sleeve 51 and protection sleeve 41 is a second annular gas passageway 55. It will be noted that the fuel gun assemblies 30 penetrate the reactor shell through the bottom support 12 of the windbox 17, traverse the windbox and pass through the constriction plate 14 of the reactor where the tip unit 32 of the fuel gun and the upper portion of the protection sleeve 41 extend into the fluid bed area of the reactor.

The sealing sleeve 51 has a pair of flanges 52 and 53 which seal the member to the constriction plate 14 so that material in the reaction chamber 15 cannot infiltrate between the sealing sleeve and the constriction plate and so find its way into the hot windbox 17. Further, the sealing sleeve prevents hot air in the windbox from by-passing the tuyeres along the side of the fuel gun assembly. The flanges 52 and 53 are fixed in position on the sealing sleeve preferably by welding.

It is desirable to protect the fuel gun assembly 30 from the high temperature prevailing in the hot windbox which may reach temperatures of 1000°F or more. Metal jacketed pipe insulation 61 is shown in position in the hot windbox surrounding the sealing sleeve 51. To accommodate relative vertical movement between the fuel gun assembly 30 and the structural elements of the reactor upon heating and cooling, a stuffing box 71 is provided, for sealing purposes, at the point where the fuel gun assembly passes through the reactor shell or hopper 12. Additionally, asbestos rope insulation 63 may be provided between the fuel gun assembly and the hopper 12 as a seal. The stuffing box and asbestos rope seals the gun assembly to the hopper and yet permits vertical movement of the gun assembly.

Outside of the reactor shell it will be seen that the sealing sleeve terminates at the cap 81 through which air conduit 23 communicates with the annular passageway 55. The protection sleeve 41 and the fuel gun 31 pass through the cap 81 and the protection sleeve 41 terminates in the reducing tee 91. Air conduit 24 is connected to the reducing tee 91 so as to provide communication with the annular passageway 45 between the protection sleeve 41 and the fuel gun. The fuel gun 34 passes through the reducing tee 91, through the ball or plug valve assembly 101, the stuffing box 111 and is connected to the fuel line 25.

A notched member 115 is provided on the stuffing box 111 in which the handle 116 is latched in operative position. It will be noted that the entire structure of the fuel gun assembly 30 is suspended from the constriction dome 14 by the sealing sleeve 51 and, in particular, by the flange 52 on the sealing sleeve which bears on the upper surface of the constriction dome 14. This suspension of the fuel gun assembly 30 can be traced through the structure as follows: The sealing sleeve 51 is threadedly connected to the cap 81, the cap is welded to the protection sleeve 41 at 82, the protection sleeve is threadedly connected to the tee 91 which is connected through nipple 94 to the valve body 101 and the valve body is connected through threaded members 105 and 106 to the stuffing box 111. It will be seen, then, that when the handle 116 of the fuel gun 34 is in latched position in the notched member 115, the entire structure depends from the flange 52 of the sealing sleeve 51.

In operation, fuel oil or gas flows through conduit 25 into the fuel passageway 35 of the fuel gun 34. When fuel oil is used, injection air is introduced into the fuel line to improve fuel dispersion. The fuel moves vertically upward in passageway 35 to the orifices 37 at which point it is injected into the fluidized bed generally horizontally or in a somewhat downwardly inclined direction. The closed end 36 of the fuel gun tends to prevent sifting of bed material into the fuel passageway 35 when the reactor is shut down or when, for any other reason, no fuel is being supplied through fuel passageway 35. At the same time pressurized air is flowing through conduits 23 and 24 into the passageways 55 and 45. In the passageway 45 the velocity of the air increases in the constricted portion 46 of the passageway thereby strongly ejecting any particulate solids which may have infiltrated along the sides of the fuel gun 34. It will be observed that if the sifting of particulate solids were permitted along the sides of the fuel gun 34 that the fuel gun would very likely become frozen in position rendering it most difficult to remove the fuel gun for the periodic cleaning which is required. The pressurized air similarly flowing from conduit 24 into passageway 55 has the function of cooling the fuel gun assembly.

The fuel gun 34 is readily removed for cleaning simply by unlatching the fuel gun from its support and withdrawing the fuel gun along the length of the protective sleeve 41. Cleaning of the fuel gun is required from time to time, since a carbonized deposit occurs in the fuel passage 35 due to the fact that the tip unit 32 extends into the fluidized bed which is at an elevated temperature. It will be noted that the fuel gun will be withdrawn through the ball or plug valve 101. When the tip of the fuel gun 34 clears the valve 101, the valve member 102 is closed to prevent hot bed material from flowing through the protective sleeve 41. When the fuel gun 34 is fully withdrawn from the reactor, cleaning of the fuel passage 35 may be undertaken. Since the fuel gun is closed at the end 36, and these fuel guns are relatively long, say 8 feet or longer, the cleaning of the fuel passageway presents certain difficulties. However, in the structure of this invention the tip unit 32 is detachable at the joint 38 from the main body 33 of the fuel gun. The relatively short length of the tip unit 32 renders it readily cleanable. While the preferred form of the fuel gun has a closed end and transaxial fuel orifices, under certain operating conditions it may be desirable to use a fuel gun with an open end. Such a fuel gun can readily be substituted for the fuel gun described in detail above.

When the fuel gun 34 is to be re-installed following cleaning, a blast of high pressure air may be introduced through line 24 to eject particulate material accumulated in the protection sleeve 41 which would otherwise resist insertion of the fuel gun.

In the above description some emphasis has been placed on reactors using a hot windbox. It will be understood that fuel guns of this invention are equally applicable to fluidized bed reactors having cold windboxes. In that case, the additional insulation 61 around the protection sleeve in the windbox can be dispensed with, and, of course, an insulated windbox may not be required. The air flowing in passages 45 and 55 still performs a cooling function, since the constriction plate is hot and both the fuel gun and the protection sleeve extend into the hot fluidized bed. The purging function of the air streams in these passageways remains unchanged.

There has thus been disclosed a novel fuel gun assembly which is particularly suited for fluidized bed reactors having large bed diameters.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. In a fluidized bed reactor having a constriction plate for supporting the fluidized bed, a windbox below the constriction plate with a bottom support therefore, at least one fuel gun assembly extending vertically through the constriction plate and traversing the windbox and the bottom support which comprises, a central tubular member having an axial fuel passage, a protection sleeve concentrically positioned about the fuel gun and spaced therefrom so that a first annular passageway is provided about the fuel gun to accommodate a flow of purge gas and a sealing sleeve in sealing engagement with said constriction plate and concentrically positioned about the protection sleeve and spaced therefrom so that a second annular gas passageway is provided about the protection sleeve to accommodate a flow of gas for sealing and cooling, a stuffing box about said sealing sleeve at said bottom support to provide a seal between the sealing sleeve at said bottom support to provide a seal between the sealing sleeve and the bottom support while permitting limited vertical and horizontal movement of the fuel gun assembly, means below said bottom support for introducing purge gas into said first annular passageway, means for introducing cooling gas into said second annular passageway and means for maintaining a flow of fuel through the fuel gun.

2. The fluidized bed reactor of claim 1 wherein the fuel gun assembly depends from the constriction plate.

3. The fluidized bed reactor of claim 2 wherein the central tubular member is closed at one end thereof and provided with transaxial fuel orifices immediately adjacent said closed end and wherein a tip portion of said tubular member including said closed end is detachable from the said tubular member.

4. The fluidized bed reactor of claim 3 wherein the sealing engagement of said sealing sleeve with said constriction plate is provided by at least one flange on said sealing sleeve in contact with said constriction plate.

5. The fluidized bed reactor of claim 4 wherein the first annular gas passageway of the fuel gun is constricted adjacent the tip thereof so as to provide an increased gas velocity.

6. In a fluidized bed reactor having a constriction plate for supporting the fluidized bed, a hot windbox below the constriction plate with a refractory bottom support therefore, at least one fuel gun assembly extending vertically through the constriction plate and traversing the hot windbox and the refractory bottom support which comprises, a central tubular member having an axial fuel passage, a protection sleeve concentrically positioned about the fuel gun and spaced therefrom so that a first annular passageway is provided about the fuel gun to accommodate a flow of purge gas and a sealing sleeve in sealing engagement with said constriction plate and concentrically positioned about the protection sleeve and spaced therefrom so that a second annular gas passageway is provided about the protection sleeve to accommodate a flow of gas for sealing and cooling, means insulating the sleeve from the hot gases present in the hot windbox, a stuffing box about said sealing sleeve at said refractory bottom support to provide a seal between the sealing sleeve and the refractory bottom support while permitting limited vertical and horizontal movement of the fuel gun assembly, means below said refractory bottom support for introducing purge gas into said first annular passageway, means for introducing cooling gas into said second annular passageway and means for maintaining a flow of fuel through the fuel gun.

7. The fluidized bed reactor of claim 6 wherein the fuel gun assembly depends from the constriction plate.

8. The fluidized bed reactor of claim 7 wherein the central tubular member is closed at one end thereof and provided with transaxial fuel orifices immediately adjacent said closed end and wherein a tip portion of said tubular member including said closed end is detachable from the said tubular member.

9. The fluidized bed reactor of claim 8 wherein the sealing engagement of said sealing sleeve with said constriction plate is provided by at least one flange on said sealing sleeve in contact with said constriction plate.

10. The fluidized bed reactor of claim 9 wherein the first annular gas passageway of the fuel gun is constricted adjacent the tip thereof so as to provide an increased gas velocity.

11. A fuel gun assembly for injecting fuel through the constriction plate into the reaction chamber of a fluidized bed reactor comprising, a central tubular member constituting the fuel gun, a protection sleeve concentrically positioned about the fuel gun and spaced therefrom so that a first annular gas passageway is provided about the fuel gun to accommodate a flow of purge gas which first cools the fuel gun and purges foreign material from the annular passageway and is then introduced into said reaction chamber, said first annular gas passageway having a restriction therein proximate the point at which said gas is introduced into said reaction chamber to increase gas velocity and thereby enhance the purging function thereof, and a sealing sleeve for sealing engagement with said constriction plate and concentrically positioned about said protection sleeve and spaced therefrom so that a second annular gas passageway is provided about the protection sleeve to accommodate a second flow of gas for sealing and cooling.

* * * * *